(12) United States Patent
Caterino et al.

(10) Patent No.: US 11,631,043 B2
(45) Date of Patent: Apr. 18, 2023

(54) METHODS AND SYSTEMS FOR ENSURING SECURE DELIVERY OF PARCELS USING INTERNET-ENABLED STORAGE RECEPTACLE

(71) Applicant: Sargent Manufacturing Company, New Haven, CT (US)

(72) Inventors: Mark A. Caterino, Prospect, CT (US); Kevin Kraus, Monument, CO (US); Garrett Lovejoy, Madison, CT (US); Jason Williams, Atlanta, GA (US); Martin Huddart, New Haven, CT (US)

(73) Assignee: Sargent Manufacturing Company, New Haven, CT (US)

( * ) Notice: Subject to any disclaimer, the term of this patent is extended or adjusted under 35 U.S.C. 154(b) by 99 days.

(21) Appl. No.: 15/334,915

(22) Filed: Oct. 26, 2016

(65) Prior Publication Data

US 2017/0124510 A1 May 4, 2017

Related U.S. Application Data

(60) Provisional application No. 62/261,520, filed on Dec. 1, 2015, provisional application No. 62/249,683, filed on Nov. 2, 2015.

(51) Int. Cl.
*G06Q 10/08* (2012.01)
*G06K 7/14* (2006.01)
(Continued)

(52) U.S. Cl.
CPC ... *G06Q 10/0833* (2013.01); *G06K 19/06037* (2013.01); *G06K 19/07758* (2013.01);
(Continued)

(58) Field of Classification Search
CPC .......... G06Q 10/0833; G06Q 10/1093; G06Q 10/08; G06Q 10/083; G06Q 10/0836;
(Continued)

(56) References Cited

U.S. PATENT DOCUMENTS 6,480,758 B2  11/2002  Stevens
6,895,241 B2   5/2005  Hara
(Continued)

FOREIGN PATENT DOCUMENTS

CN  103337110 A  * 10/2013
EP  2 075 769 A2   7/2009
(Continued)

OTHER PUBLICATIONS

Luxer One, Why Properties Prefer Luxer One, Oct. 2015) https://www.youtube.com/watch?v=4dnDmOsorgs (Year: 2015).*
(Continued)

*Primary Examiner* — Patricia H Munson
*Assistant Examiner* — Thea Labogin
(74) *Attorney, Agent, or Firm* — Wolf, Greenfield & Sacks, P.C.

(57) ABSTRACT

Methods and system for securing delivery of a parcel when an intended recipient is unavailable, comprising at least one storage receptacle having an electronically controlled locking mechanism, the storage receptacle comprising an interface for receiving an access code for facilitating unlocking of the storage receptacle, a wireless communication radio, and a processor. The system further comprises a remote service manager comprising an access code generator and a wireless communication radio for transmitting an access code to a mobile computing device operated by a delivery carrier. The mobile computing device includes a wireless communication radio, one or more processors, and a memory comprising instructions which, when executed by
(Continued)

the one or more processors, cause the one or more processors to: receive, via the wireless communication radio, from the remote service manager, a single use access code for facilitating unlocking of the storage receptacle, and transmit the access code to the storage receptacle interface. The storage receptacle processor confirms the validity of the access code and causes the storage receptacle to first unlock and then lock after detection of the parcel within the storage receptacle.

21 Claims, 7 Drawing Sheets

(51) Int. Cl.
| | |
|---|---|
| *G07C 9/00* | (2020.01) |
| *G06K 19/06* | (2006.01) |
| *G06K 19/077* | (2006.01) |
| *G06Q 10/0833* | (2023.01) |
| *G06Q 10/083* | (2023.01) |
| *G06Q 10/10* | (2012.01) |
| *G06Q 10/1093* | (2023.01) |

(52) U.S. Cl.
CPC ....... *G06Q 10/083* (2013.01); *G07C 9/00309* (2013.01); *G07C 9/00896* (2013.01); *G06K 7/1417* (2013.01); *G06Q 10/1093* (2013.01); *G07C 2009/00769* (2013.01)

(58) Field of Classification Search
CPC .......... G06K 19/07758; G06K 7/1417; G06K 19/06037; G07C 2009/00769; G07C 9/00896; G07C 9/00309; G07C 2009/00261; A47G 29/1207; A47G 29/22; A47G 29/30
USPC ........................................................ 705/7.18
See application file for complete search history.

(56) References Cited

U.S. PATENT DOCUMENTS

| | | | |
|---|---|---|---|
| 7,815,112 B2 | 10/2010 | Volpe et al. | |
| 9,218,696 B2 | 12/2015 | Dumas et al. | |
| 10,402,775 B2* | 9/2019 | Lievens | G06Q 10/08355 |
| 2002/0035515 A1* | 3/2002 | Moreno | G07F 17/12 340/5.73 |
| 2002/0156645 A1* | 10/2002 | Hansen | G07F 7/00 705/333 |
| 2004/0122780 A1 | 6/2004 | Devar | |
| 2004/0181570 A1 | 9/2004 | Kaneko | |
| 2005/0104716 A1 | 5/2005 | Simms et al. | |
| 2007/0024421 A1 | 2/2007 | Hale | |
| 2007/0247276 A1* | 10/2007 | Murchison | G07C 9/00087 340/5.2 |
| 2009/0179735 A1 | 7/2009 | Van Rysselberghe | |
| 2010/0082152 A1* | 4/2010 | Mishra | G06Q 10/08 700/226 |
| 2011/0046775 A1* | 2/2011 | Bailey | G06Q 50/28 700/224 |
| 2011/0130134 A1* | 6/2011 | Van Rysselberghe | A47G 29/141 455/422.1 |
| 2012/0062362 A1 | 3/2012 | Rudduck et al. | |
| 2012/0118947 A1 | 5/2012 | Lyons et al. | |
| 2013/0088323 A1 | 4/2013 | Ryan | |
| 2013/0144428 A1* | 6/2013 | Irwin | B65G 1/0485 700/218 |
| 2014/0014008 A1 | 1/2014 | Tompkins | |
| 2014/0035721 A1 | 2/2014 | Heppe et al. | |
| 2014/0279663 A1* | 3/2014 | Lievens | G06Q 10/08 |
| 2014/0270401 A1* | 9/2014 | Irwin | G06Q 30/0185 382/115 |
| 2014/0330603 A1* | 11/2014 | Corder | G05B 15/02 705/7.12 |
| 2015/0102903 A1 | 4/2015 | Wilkinson | |
| 2015/0106291 A1* | 4/2015 | Robinson | G06F 21/62 705/339 |
| 2015/0106292 A1 | 4/2015 | Robinson et al. | |
| 2015/0120601 A1 | 4/2015 | Fee | |
| 2015/0371468 A1 | 12/2015 | Mackin et al. | |
| 2016/0025549 A1* | 1/2016 | Motoyama | G07F 17/13 177/1 |
| 2016/0027261 A1* | 1/2016 | Motoyama | G08B 5/36 340/313 |
| 2016/0060008 A1* | 3/2016 | Farentinos | E05B 49/002 220/211 |
| 2016/0098679 A1* | 4/2016 | Levy | G06Q 10/08 |
| 2016/0216106 A1* | 7/2016 | Motoyama | G01B 11/28 |
| 2017/0293885 A1* | 10/2017 | Grady | G08B 21/18 |
| 2017/0330145 A1* | 11/2017 | Studnicka | G06Q 10/0836 |
| 2018/0075681 A1 | 3/2018 | Scalisi et al. | |
| 2018/0190062 A1* | 7/2018 | Robinson | G06F 21/62 |

FOREIGN PATENT DOCUMENTS

| | | |
|---|---|---|
| GB | 2 483 474 A | 3/2012 |
| GB | 2 520 698 A | 6/2015 |

OTHER PUBLICATIONS

Biersdorfer, J.D., (2014, Locking Up Amazon Deliveries) https://www.nytimes.com/2014/03/14/technology/personaltech/locking-up-amazon-deliveries.html (Year: 2014).*
LuxerOne (2015, LuxerOne Package Lockers: How it works) (Year: 2015).*
Technmoan (2015, The Amazon Locker Experience) (Year: 2014).*
Stanislaw Iwan et al. Analysis of Parcel Lockers' Efficiency as the Last Mile Delivery Solution—The Results of the Research in Poland, Transportation Research Procedia, vol. 12, 2016, pp. 644-655 (presented at the 9th International Conference on City Logistics Jun. 2015) (Year: 2016).*
Extended European Search Report for European Application No. 16862725.5, dated Feb. 19, 2019.
Examination Report for European Application No. 16862725.5, dated Feb. 24, 2020.
International Search Report and Written Opinion for International Application No. PCT/US2016/058891, dated Feb. 17, 2017.
International Preliminary Report on Patentability for International Application No. PCT/US2016/058891, dated May 17, 2018.

* cited by examiner

METHODS AND SYSTEMS FOR ENSURING SECURE DELIVERY OF PARCELS USING INTERNET-ENABLED STORAGE RECEPTACLE

RELATED APPLICATIONS

This application claims priority to U.S. Patent App. No. 62/249,683 filed on Nov. 2, 2015, and U.S. Patent App. No. 62/261,520 filed on Dec. 1, 2015.

BACKGROUND OF THE INVENTION

1. Field of the Invention

The present invention relates to storage receptacles for parcels such as those traditionally purchased from e-commerce vendors or merchants, and more specifically, to a home storage receptacle having an electronically controlled locking mechanism and methods for ensuring secure delivery of parcels to the home storage receptacle when the intended recipient is unavailable to accept delivery or is unable to provide signature confirmation of receipt of a delivery.

2. Description of Related Art

Concerns associated with unattended parcel delivery include overall security of delivery, validation of delivery and/or receipt of the parcel, and alternatives to signature confirmation. Because the delivery carrier is often not aware of the presence (or absence) of the intended recipient of the parcel, shipments that require delivery and/or signature confirmation often go unfilled. Multiple attempts at such deliveries can result in a waste of time and fuel by the carrier, and potential loss of opportunity for further e-retail revenue. These problems often stem from uncertainty with regard to "trust". For example, does the intended recipient trust that their neighbor (or any stranger) does not steal an unattended delivery? Does the carrier trust that the recipient will not improperly claim that a delivered parcel was not received? Does the recipient trust that the carrier driver will not keep the parcel, but claim it was delivered? Does a first carrier (and/or the recipient) trust that a second carrier will not steal a first delivery and claim no knowledge or awareness of the first delivery?

Various attempts to mitigate these problems have been attempted. These include residential parcel receptacles that may be opened via a code and community parcel lockers located at regional delivery depots. These solutions are not without deficiencies. For example, parcel lockers are typically located regionally, and may be in less than convenient locations. Further, such parcel receptacles often require manual attempts to provide signature confirmation (i.e. the recipient must remember to leave a signed document within the receptacle), and require manual setting, re-setting, and provision of the code to the delivery carrier. Further, if multiple deliveries are scheduled, there is no way to be certain that a prior delivery is not stolen by a subsequent delivery person.

Therefore, a need exists for a means to ensure secure home parcel delivery if the intended recipient is not available at the time of delivery to receive the parcel or is otherwise unable to provide signature confirmation.

SUMMARY OF THE INVENTION

Bearing in mind the problems and deficiencies of the prior art, it is therefore an object of the present invention to provide a method of ensuring secure delivery of one or more parcels when the intended recipient is unavailable at the time of delivery.

It is another object of the present invention to provide a method of validating delivery of a parcel when the intended recipient is unavailable at the time of delivery.

A further object of the invention is to provide a method of ensuring secure delivery of a parcel when the intended recipient is unavailable at the time of delivery and the delivery carrier requires signature confirmation.

Still another object of the invention is to provide a method of ensuring that the correct parcel is delivered when the intended recipient is unavailable at the time of delivery.

Still yet another object of the invention is to provide a secure receptacle having an electronically controlled locking mechanism for receiving a delivered parcel when the intended recipient is unavailable at the time of delivery.

Still other objects and advantages of the invention will in part be obvious and will in part be apparent from the specification.

The above and other objects, which will be apparent to those skilled in the art, are achieved in the present invention which is directed to a system for securing delivery of a parcel when an intended recipient is unavailable. The system comprises at least one storage receptacle having an electronically controlled locking mechanism, the storage receptacle comprising an interface for receiving an access code for facilitating unlocking of the storage receptacle, a wireless communication radio, and a processor. The system further includes a remote service manager comprising an access code generator and a wireless communication radio for transmitting a generated access code to a mobile computing device operated by a delivery carrier in response to a request. The mobile computing device includes a wireless communication radio, one or more processors, and a memory comprising instructions which, when executed by the one or more processors, cause the one or more processors to: receive, via the wireless communication radio, from the remote service manager, a generated single use access code for facilitating unlocking of the storage receptacle locking mechanism, and transmit the generated access code to the storage receptacle interface. The storage receptacle processor confirms the validity of the generated access code and causes the storage receptacle locking mechanism to first unlock and then lock after detection of the parcel within the storage receptacle.

The at least one storage receptacle may further comprise at least one camera at the storage receptacle in a location positioned to record activity of the delivery carrier, the at least one camera configured to begin recording when the mobile computing device begins to transmit the access code to the storage receptacle interface.

In an embodiment, the system may further comprise at least one sensor to ascertain identifying parameters of the parcel during placement of the parcel in the storage receptacle. The at least one sensor may comprise an infrared scanner or ultrasonic scanner to measure parcel dimensions, a barcode scanner or a QR code scanner to read a tracking label on the parcel, or a scale or other balancing means to measure the weight of the parcel.

In another aspect, the present invention is directed to a method for securing delivery of a parcel to a storage receptacle when an intended recipient is unavailable, wherein the storage receptacle is registered with a vendor and specified as a delivery address for a parcel purchased from the vendor. The storage receptacle comprises an electronically controlled locking mechanism, an interface for receiving an access code for facilitating unlocking of the storage receptacle, a wireless communication radio, and a processor. The method comprises contacting, by a delivery carrier, the intended recipient of the parcel to obtain authorization for delivery of the parcel to the storage receptacle based on parcel and storage receptacle identifying data received from the vendor; contacting, by the delivery carrier, a remote service manager to provide a parcel tracking number and estimated delivery timing; receiving, by a mobile computing device operated by the delivery carrier, from the remote service manager, a single use access code for facilitating unlocking of the storage receptacle; transmitting, from the mobile computing device, the access code to the storage receptacle interface via the wireless communication radio; confirming, by the storage receptacle processor, the validity of the access code; unlocking, by the storage receptacle processor, the secure receptacle locking mechanism to permit access to the interior of the storage receptacle; and re-locking, by the storage receptacle processor, the storage receptacle locking mechanism after detection of the parcel within the storage receptacle.

The storage receptacle identifying data may comprise at least one of a serial number or global positioning system metadata, and the parcel identifying data may comprise parcel dimensions. In an embodiment, the storage receptacle identifying data may comprise storage receptacle dimensions, and the method may further comprise confirming, by the remote service manager, that the storage receptacle dimensions are in excess of the parcel dimensions.

The method may further comprise: determining, by the remote service manager, whether multiple parcel deliveries are scheduled for a same estimated delivery timing by one or more delivery carriers; and responsive to the storage receptacle dimensions not being in excess of a total of the dimensions of the multiple parcels, instructing, by the remote service manager, at least one of the one or more delivery carriers to postpone delivery. In an embodiment, prior to instructing at least one of the one or more delivery carriers to postpone delivery, the method may comprise: contacting, by the remote service manager, the intended recipient of the multiple parcels to obtain delivery prioritization; and generating, by the remote service manager, a time-bound access code for each delivery.

The storage receptacle may comprise at least one sensor for measuring the dimensions and, optionally, weight of a delivered parcel, and the parcel identifying data may comprise parcel dimensions and weight which is encoded in the access code, and the method may further comprise: measuring, by the storage receptacle at least one sensor, the dimensions and optionally, weight, of the delivered parcel; and confirming, by the storage receptacle processor, that the delivered parcel has the parcel identifying data encoded in the access code. The storage receptacle at least one sensor may comprise at least one of an infrared scanner, an ultrasonic scanner, a barcode scanner, a QR code scanner, or a scale.

The storage receptacle may further include one or more audible and, optionally, visible feedback mechanisms, and the step of confirming, by the storage receptacle processor, that the delivered parcel has the parcel identifying data encoded in the access code may comprise receiving audible and, optionally, visible feedback from the storage receptacle one or more audible and visible feedback mechanisms. The method may further include the step of: transmitting, from the delivery carrier mobile computing device, the audible and visible feedback to the remote service manager and, optionally, an intended recipient of the delivered parcel. In another embodiment, responsive to the delivered parcel not having the parcel identifying data encoded in the access code, the method may further comprise: receiving, by the delivery carrier mobile computing device, an error notification.

The method may further comprise the steps of: photographing, by the delivery carrier mobile computing device, the parcel being placed in the storage receptacle; comparing the photograph global positioning system metadata to the storage receptacle global positioning system metadata to detect a match; and responsive to detecting a match, confirming that the parcel was delivered to the correct storage receptacle.

In another embodiment, the method may further comprise: reporting an event to the remote service manager via the storage receptacle wireless communication radio, wherein the event is selected from a group comprising: the presence of a delivered parcel in the storage receptacle; the opening or closing of the storage receptacle; the entry of a valid access code; and the entry of an invalid access code.

The storage receptacle may further comprise at least one camera positioned at the storage receptacle in a location positioned to record activity of the delivery carrier, the at least one camera configured to begin recording when the mobile computing device begins to transmit the access code to the storage receptacle interface, and the method may further comprise the steps of: recording an entry event at the storage receptacle; and reporting the entry event to the remote service manager via the storage receptacle wireless communication radio.

In yet another aspect, the present invention is directed to a method for confirming delivery of a parcel to a storage receptacle having an electronically controlled locking mechanism, comprising: providing, by a delivery carrier, to an intended recipient of a parcel, an estimated parcel delivery time; confirming, by the intended recipient, availability to receive a communication from the delivery carrier at the estimated parcel delivery time; comparing a global positioning system metadata of a mobile computing device operated by the delivery carrier to a global positioning system metadata of the storage receptacle to determine a match; contacting, by the delivery carrier mobile computing device, a computing device operated by the intended recipient; providing, by the delivery carrier mobile computing device, video of delivery of the parcel into the storage receptacle to the intended recipient computing device; and digitally signing, by the intended recipient, on the intended recipient computing device to acknowledge delivery.

The method may further comprise: providing, by the delivery carrier mobile computing device, video of closing and locking of the storage receptacle to the intended recipient computing device.

BRIEF DESCRIPTION OF THE DRAWINGS

Figure 1:
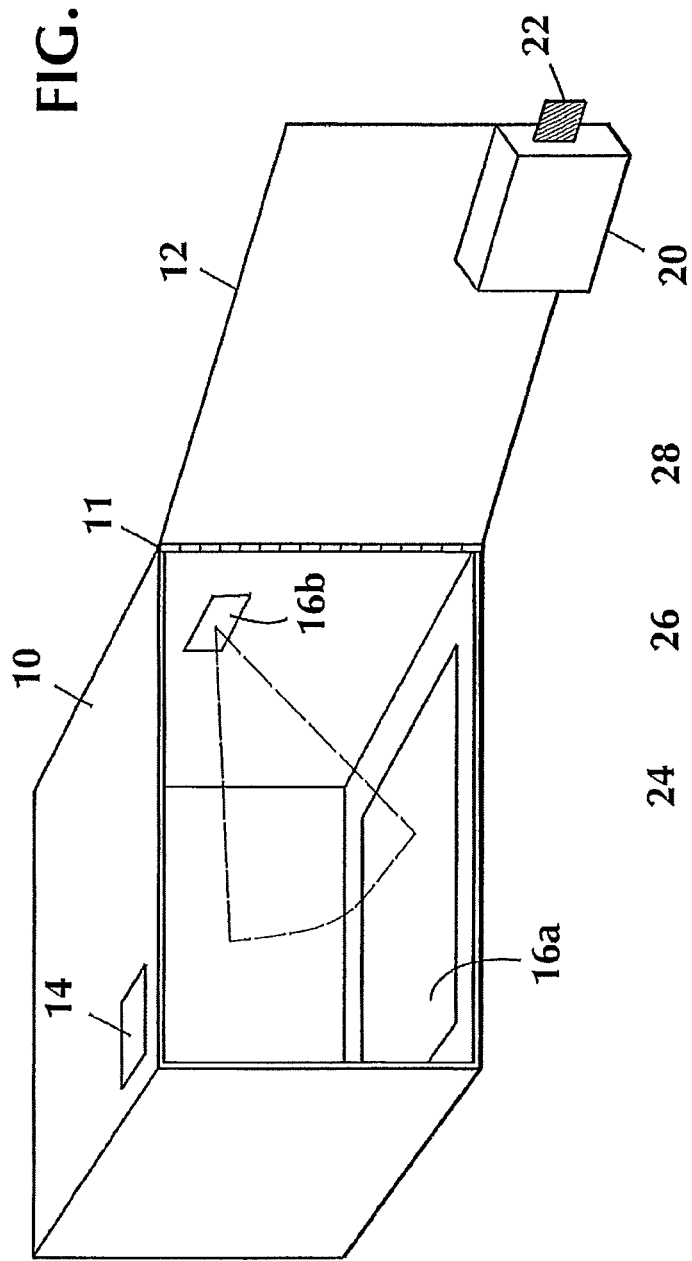
FIG. 1 is a perspective view of an embodiment of the secure storage receptacle of the present invention.

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1A shows details of the electronically controlled lock of FIG. 1, including a power source, processor, actuator, and wireless communication means.

Figure 2:
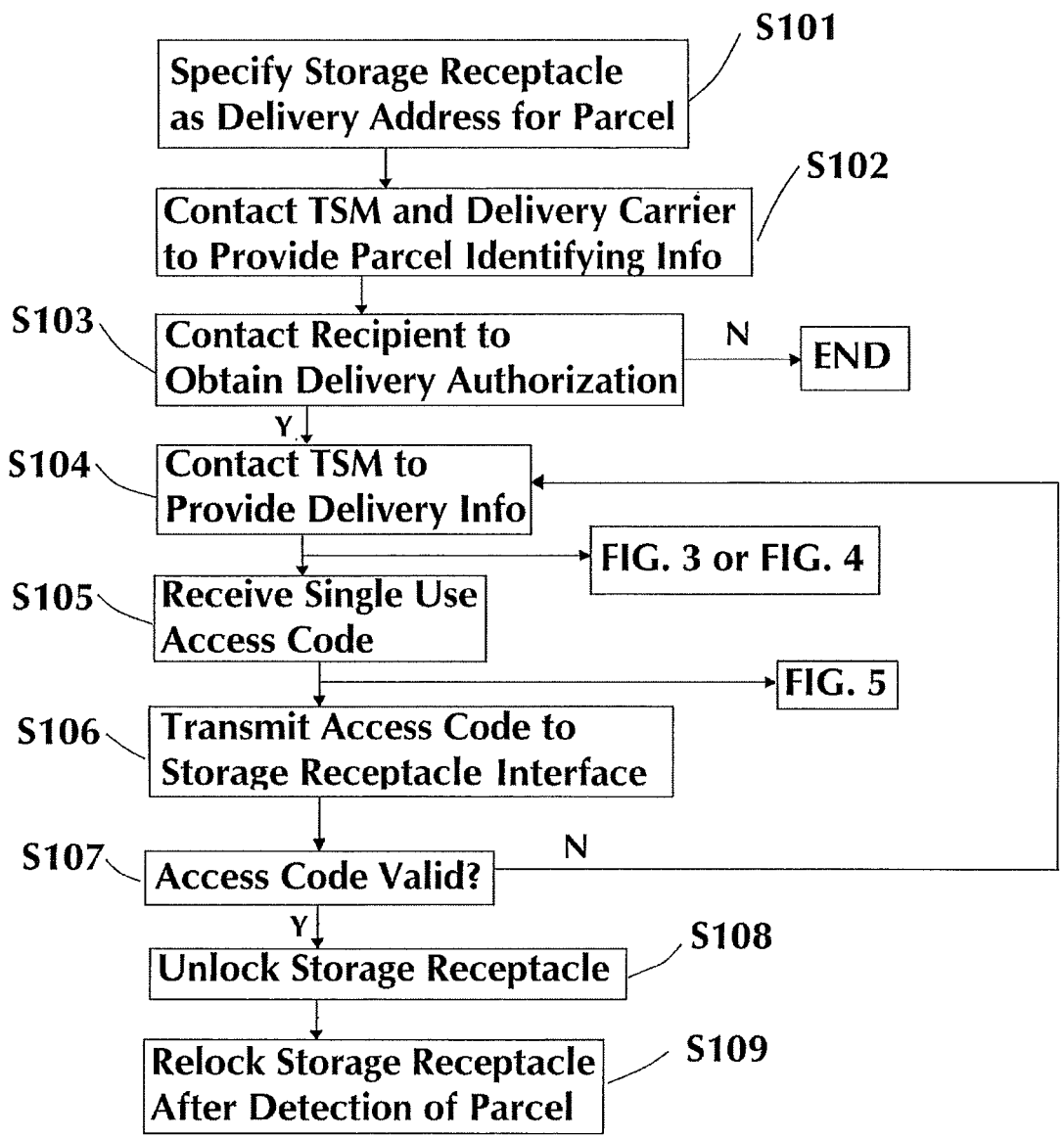

FIG. 2 is a flow diagram of one embodiment of a method for securing delivery of a parcel to a home storage receptacle if the intended recipient is unavailable to accept delivery.

Figure 3:
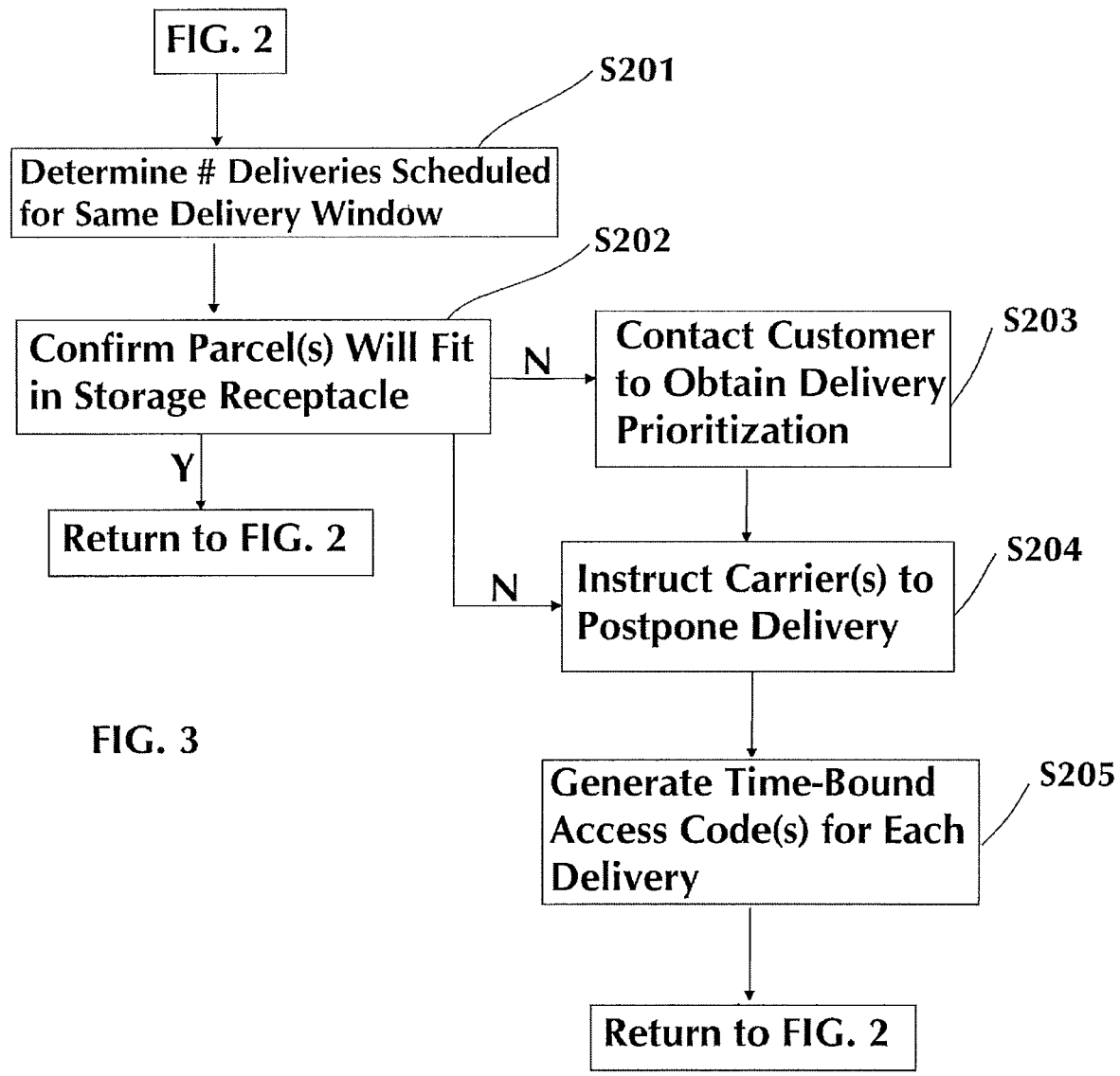

FIG. 3 is a flow diagram of another embodiment of a method for securing delivery of a parcel to a home storage receptacle, whereby delivery prioritization may be scheduled due to insufficient space.

Figure 4:
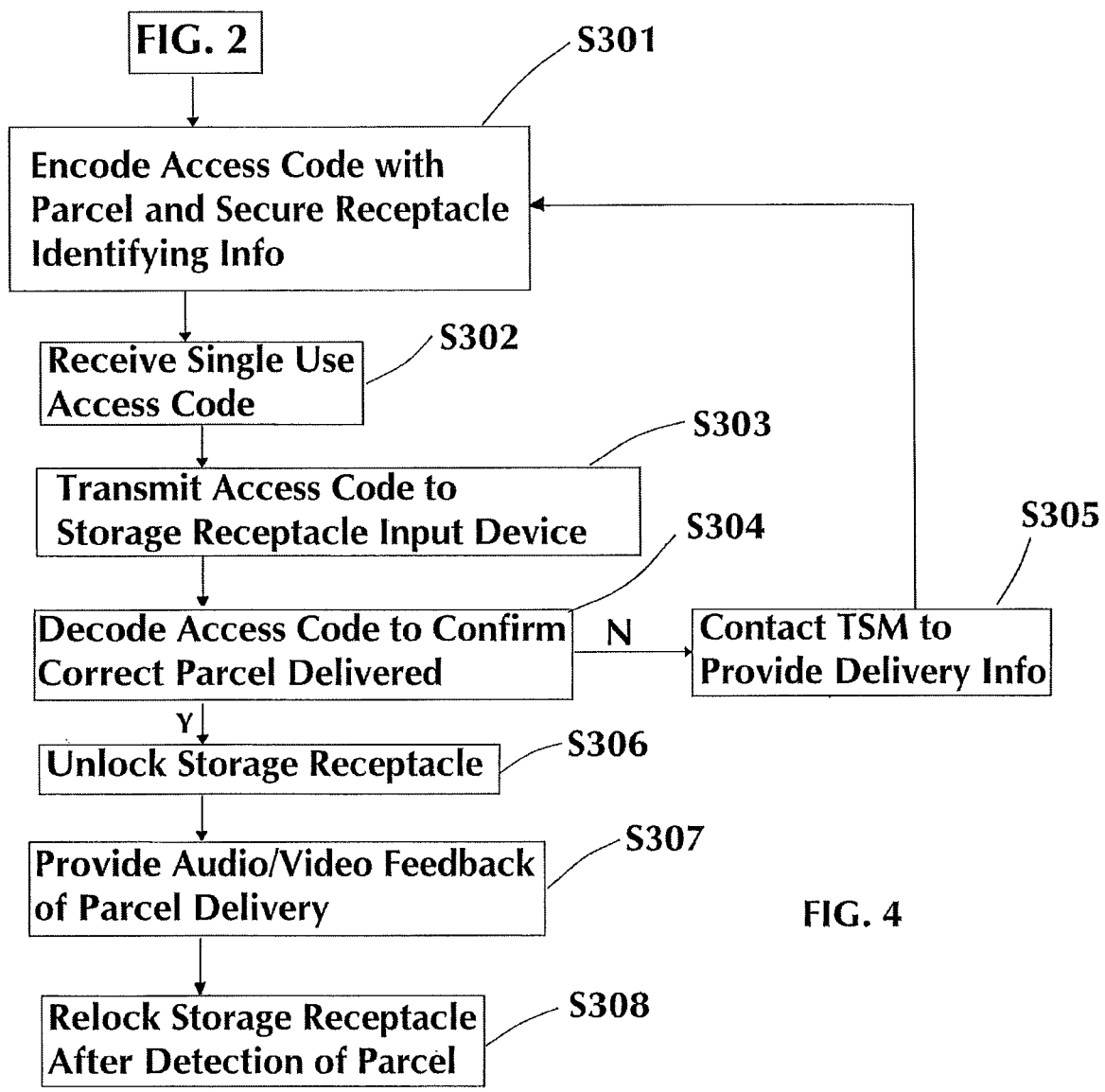

FIG. 4 is a flow diagram of another embodiment of a method for securing delivery of a parcel to a home storage receptacle, whereby the method includes a means of confirming that the proper parcel was delivered.

Figure 5:
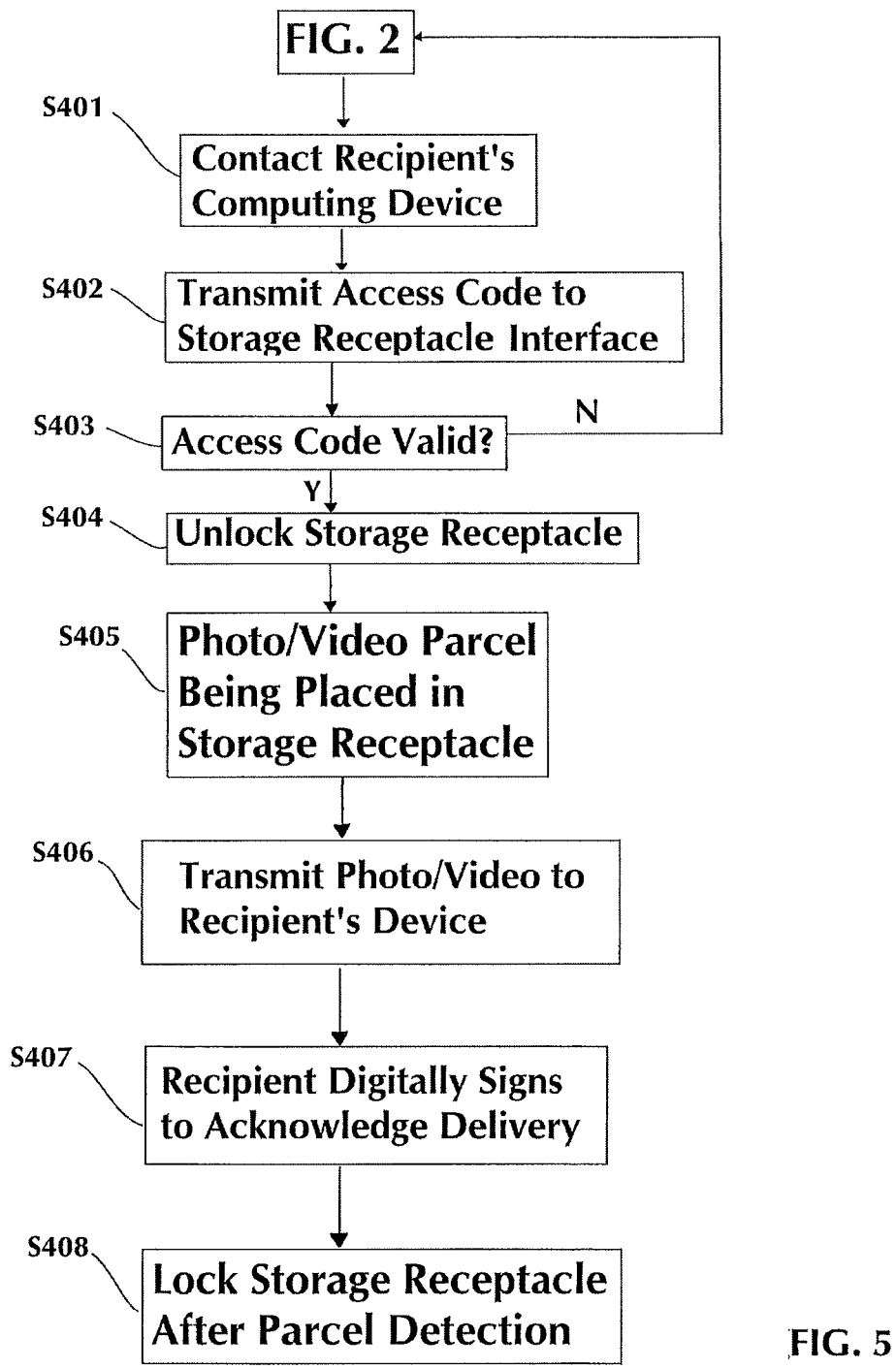

FIG. 5 is a flow diagram of a method for confirming delivery of a parcel if the intended recipient is unavailable to accept delivery.

Figure 6:
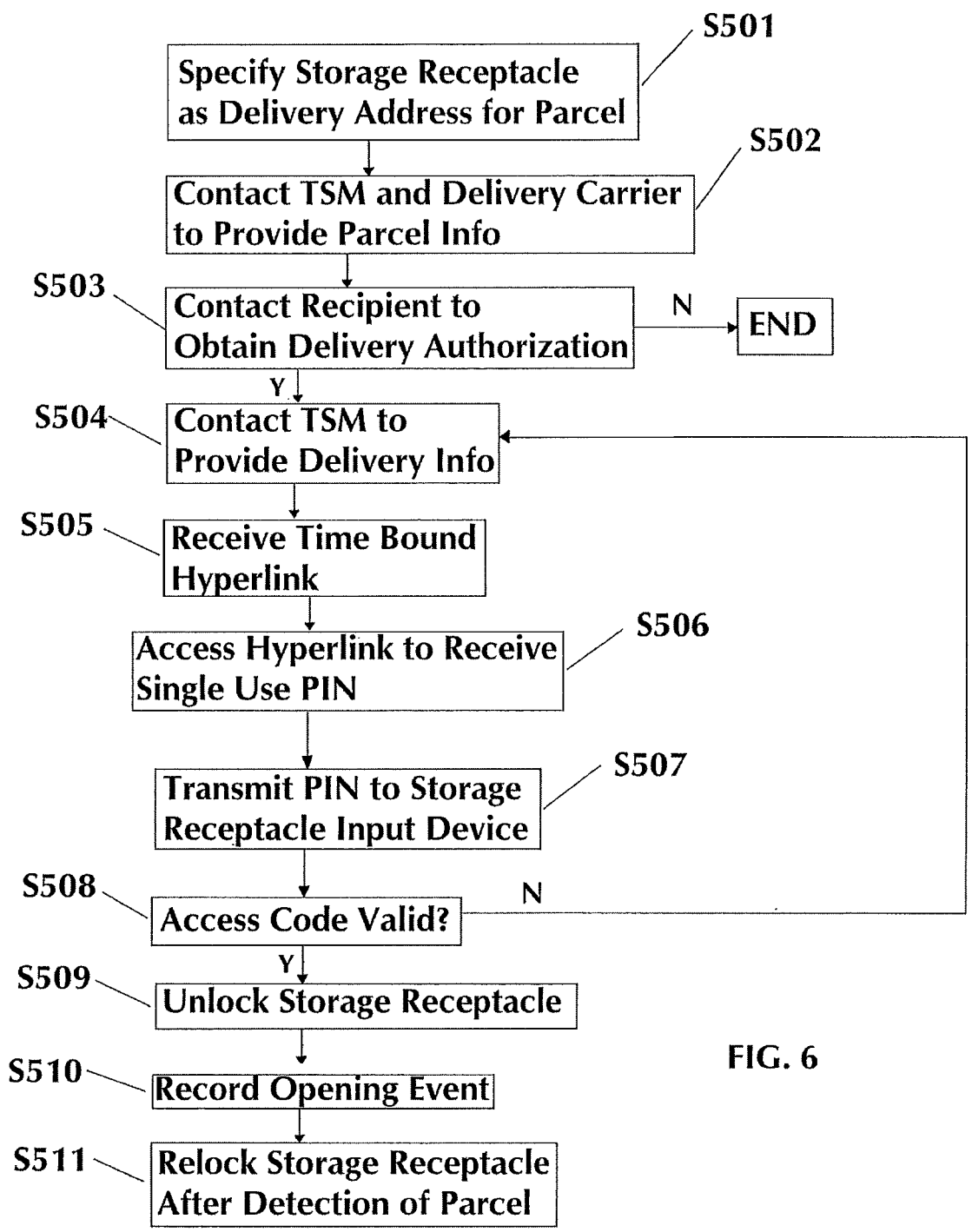

FIG. 6 is a flow diagram of another embodiment of a method for securing delivery of a parcel to a home storage receptacle.

Figure 7:
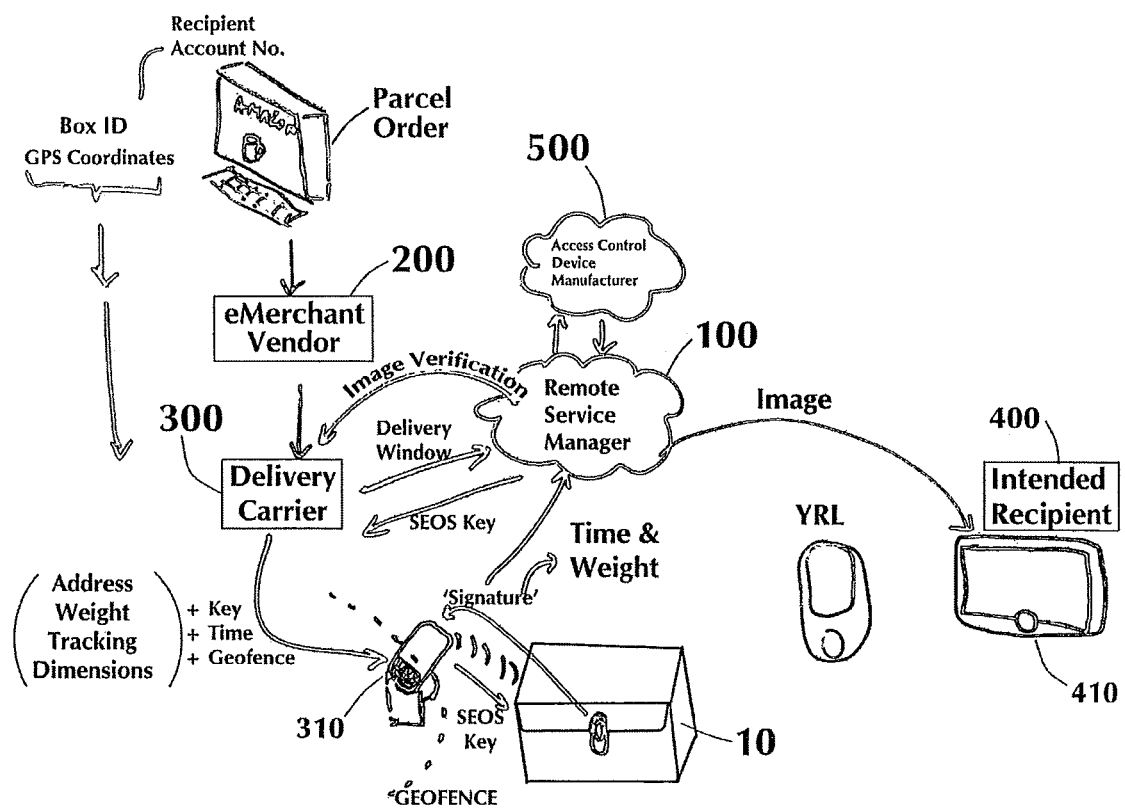

FIG. 7 is a block diagram of an embodiment of the secure parcel delivery system of the present invention.

DESCRIPTION OF THE EMBODIMENT(S)

In describing the embodiments of the present invention, reference is made herein to FIGS. 1-7 of the drawings in which like numerals refer to like features of the invention.

A secure parcel receptacle for residential home use is provided which utilizes electronically controlled locking and tracking technology. Through use of unique digital keys that are each tied to a specific transaction, the identity and timing of each opening event of the secure receptacle may be controlled and/or recorded. Content identification techniques can further assure the integrity of each opening event. The present invention further provides methods for ensuring secure parcel delivery if the intended recipient is not available at the time of delivery to receive the parcel, or is otherwise unable to provide required signature confirmation.

In a first aspect, as shown in FIG. 7, the present invention is directed to a system for securing delivery of a parcel, such as a parcel ordered from an online merchant or vendor 200. The system may be used when the intended recipient 400 is unavailable to receive delivery of the parcel or is otherwise unable to provide a signature confirmation, if required by the delivery carrier. As used herein, the term "delivery carrier" is used interchangeably to describe any of a commercial courier assigned to deliver a parcel ordered from a vendor or merchant (such as UPS, FedEx, DHL, USPS or other similar commercial courier), a delivery person associated with a commercial courier, or an individual person delivering a parcel (such as through a peer-to-peer exchange). In an embodiment, the system comprises at least one storage receptacle 10 having an electronically controlled locking mechanism and an interface for receiving an access code for facilitating unlocking of the storage receptacle, a wireless communication radio, and a processor. The system further comprises a remote service manager or trusted service manager (TSM) 100 which manages the storage receptacle and associated lock in the absence of the intended recipient. The TSM 100 comprises an access code generator which generates a single use access code or digital key and transmits the key via a wireless communication radio to a dedicated handheld or mobile computing device 310 operated by a delivery carrier 300, in response to a request from the mobile computing device. The mobile computing device 310 includes a wireless communication radio, one or more processors, and a memory comprising instructions which, when executed by the one or more processors, cause the one or more processors to receive an access code from the remote service manager 100 and transmit the generated access code to the storage receptacle interface to unlock the storage receptacle.

Referring now to FIG. 1, an embodiment of a storage receptacle according to the present invention is shown. As shown in FIG. 1, the storage receptacle 10 may be in the form of a rectangular container with at least one side operable to be opened by a door or panel 12 hinged 11 along one edge to allow the panel to open and close. A lock 20 is provided on the door panel 12 having an electronically controlled locking means or latch 22 which, when in its latched state, is configured to prevent the panel from being opened. Those skilled in the art should appreciate that the receptacle can be essentially any size and shape, and that configurations other than a rectangular container may be employed within the scope of the invention, so long as the receptacle includes a locking means which may be configured between a locked and unlocked state to alternately permit and prevent a door or panel from being opened to permit access to the interior of the receptacle. The receptacle 10 is further provided with an input interface 14 for inputting an access code or digital key configured to cause the electronic locking means to open and permit access to the interior of the storage receptacle for placement of a parcel. In an embodiment, the interface 14 may be a numeric keypad (not shown) for inputting a valid access or PIN code received from the remote service manager or TSM 100 of the lock.

In other embodiments, the access code input interface 14 may be a wireless communication means, such as a Bluetooth or near-field communication (NFC) device. It should be understood by those skilled in the art that other wireless communication means may be also employed within the scope of the invention, such as WiFi, infrared, optical, radio frequency identification (RFID), or other mobile telephone technology. In at least one embodiment, input of a valid digital key to cause the electronic locking means to open may be achieved by means of NFC, Bluetooth, WiFi, or other wireless communications with the storage receptacle's access code input interface 14. In other embodiments, interface 14 may comprise both a keypad and a wireless communication means. A processor 26 integral with the storage receptacle lock 20 is adapted to determine the validity of the access code entered and, if valid, to transmit an unlock signal to an actuator 23 to retract the electronic latch 22 (FIG. 1A).

Figure 1A:
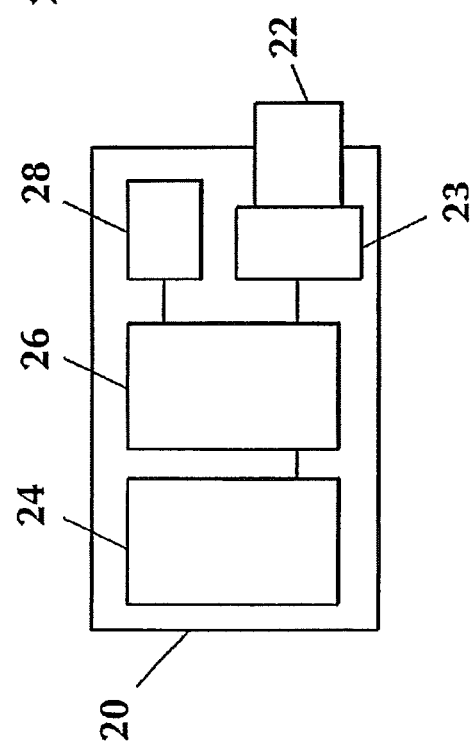

As further shown in FIG. 1A, the lock 20 has a power source 24 which, in the embodiment described and shown herein, may be a battery. In other embodiments, the power source 24 can comprise other sources of electrical power such as mains power, a capacitor, a fuel cell, a photovoltaic cell or a combination thereof, such as mains power with a battery backup. Those skilled in the art should appreciate that the storage receptacle 10 of the present invention may be configured with electrical devices that have a relatively low power consumption, thus the storage receptacle could be entirely powered using an internal battery, and without any external wiring connections. In at least one embodiment, the receptacle further comprises a wireless communication radio 28 for communicating with devices outside of the storage receptacle, such as a handheld or mobile computing device 310 operated by a delivery carrier 300, and wirelessly communicating with the remote service manager or TSM 100 of the lock.

In various embodiments, as shown in FIG. 1, the storage receptacle 10 may comprise one or more sensors 16 to ascertain parameters of the delivered parcel during, and after, placement of the parcel within the storage receptacle. By way of example, and without limitation, the receptacle 10 may include an infrared or ultrasonic scanner 16b to measure the approximate dimensions of the parcel, a barcode or QR code scanner to read a tracking label on the parcel, or a scale or other balancing means 16a to measure the weight of the parcel. FIG. 1 depicts a scale 16a positioned at the base of the interior of the receptacle and an infrared or ultrasonic scanner 16b along an interior wall. As will be described below, the output of the sensor(s) 16 may be used to confirm that the correct parcel was delivered to the receptacle by means of comparing the measured output to parcel identifying data which has been encoded in the digital key by the remote service manager or TSM 100.

In still other embodiments, the storage receptacle 10 may include at least one camera in electronic communication with the storage receptacle processor 26 and positioned to record activity of the delivery carrier 300, such as input of a valid or invalid digital key, placement of a parcel inside the receptacle, and opening or closing of the receptacle door or panel 12. The camera may be configured to begin recording when the carrier's handheld or mobile device begins to transmit the single use digital key received from the remote service manager to the access code input interface of the storage receptacle. As will be described in further detail below, in an embodiment, the recorded event may be transmitted by the storage receptacle 10 to the remote service manager or TSM 100, and optionally, a computing device 410 operated by the intended recipient 400, via the storage receptacle's wireless communication radio 28.

The receptacle may be registered with a merchant or vendor 200, as well as the remote service manager or TSM 100, using receptacle-specific identifying data, such as by serial number (MAC of the lock) and/or global positioning system (GPS) coordinates of the storage receptacle.

In another aspect, as shown in FIG. 2, the present invention is directed to a method for securing delivery of a parcel to a storage receptacle when the intended recipient is unavailable. A customer or intended recipient 400 of a parcel first purchases a storage receptacle 10 from a known access control device manufacturer 500 and registers the storage receptacle with a third party trusted service manager (TSM) or remote service manager 100, for example by serial number (MAC of the lock) and/or global positioning system (GPS) coordinates of the storage receptacle. The TSM 100 is responsible for authorizing access to the storage receptacle in the absence of the intended recipient of the parcel, e.g. by providing the delivery carrier with a single use access code or digital key for facilitating the unlocking of the receptacle at the time of delivery. The customer also registers the storage receptacle with one or more merchants or vendors 200, e.g. Amazon.com, from which a parcel can be ordered or purchased. It should be understood by those skilled in the art that the terms "merchant" or "vendor" as used herein generally describe any source from which goods are purchased and delivered, and may include e-commerce or online merchants, in-store purchases, and peer-to-peer exchanges.

At step S101, after making a purchase of a parcel or parcels from an merchant or vendor for which delivery or signature confirmation is required (or requested), the customer 400 specifies the storage receptacle 10 as the delivery address, and selects the delivery speed (and, optionally, the delivery carrier). At step S102, the vendor then contacts the TSM or remote service manager 100 to provide order confirmation information, as well as the storage receptacle's identifying information, e.g. Serial Number, GPS coordinates. In one or more embodiments, the customer or intended recipient 400 may purchase the storage receptacle directly from the vendor 200 or delivery carrier 300, in which case the vendor or delivery carrier may also act as the remote service manager or TSM for the receptacle. After receiving instructions to pick up the parcel from the merchant or vendor, including the order confirmation and other delivery instructions, at step S103 the delivery carrier 300 then contacts the customer to obtain the customer's acknowledgement of liability for receipt of parcel upon the (secured) opening of the storage receptacle 10. In one embodiment of the present invention, it is contemplated that the secured opening of the storage receptacle thereby serves as the customer's signature acknowledging delivery upon the opening event.

At step S104, the delivery carrier 300 then contacts the remote service manager or TSM 100 to provide order confirmation information, including the tracking number and estimated delivery date/time. At step S105, the remote service manager 100 confirms the order confirmation information and, after confirming the order, wirelessly provides to the delivery carrier 300 a single-use access code or digital key for facilitating opening of the storage receptacle, which is sent directly to the carrier's dedicated handheld or mobile device 310 and is not visible to carrier. In one or more embodiments, the digital key may be time bound to the estimated delivery date/time window or geo-fence bound to the vicinity of the storage receptacle. In at least one embodiment, the date/time bounding may be synchronized with a real time clock within the lock 20. Alternatively, or in addition as a backup method of access in case of digital key failure, the remote service manager or TSM 100 may provide a single-use, carrier specific personal identification number (PIN) which is forwarded to the carrier's dedicated handheld or mobile device 310 for manual entry on the input interface 14 of the storage receptacle, such as a numeric keypad. At step S106, the carrier's handheld or mobile device 310 wirelessly provides to the lock 20 the digital key to open the storage receptacle, such as by short range wireless communication (e.g. Bluetooth, NFC, RFID, WiFi). In an embodiment of the present invention, the wireless communication between the carrier's device 310 and the input interface 14 may be via NFC or Bluetooth Low Power (Bluetooth 4.0), such as using Seos™ Mobile Access Locking Technology by ASSA ABLOY.

The processor 26 in the lock interface confirms the validity of the access code at step S107, and if confirmed, transmits an unlock signal to the lock actuator 23 to allow the storage receptacle 10 to be opened for placement of the parcel therein (step S108). In an embodiment, the carrier's handheld device 310 may record the opening-event, and via its data feed, i.e. long range wireless communication radio, provides this information back to the remote service manager or TSM 100 of the lock. The TSM 100 records the event, and may optionally notify the customer or intended recipient 400 of the opening event by the specific carrier 300 for the specific order or tracking number, presuming that the carrier has already captured the event via its own proprietary software. At step S109, the storage receptacle 10 re-locks after detection of the parcel inside the receptacle, and the digital key is deactivated and removed from the carrier's handheld device 310 to prevent additional opening events.

Referring now to FIG. 3, the system of the present invention allows for confirmation that the parcel or parcels to be delivered will fit within the storage receptacle, such as if multiple parcel deliveries are scheduled for the same delivery window. The customer or intended recipient 400 purchases at least one parcel from a vendor 200 and specifies the storage receptacle 10 as the delivery address, as described above. When the delivery carrier 300 contacts the remote service manager or TSM 100 to provide order confirmation information, the delivery carrier may also provide approximate parcel dimensions. The TSM 200 will then confirm that the parcel dimensions are no larger than the dimensions of the storage receptacle 10, and if confirmed, will provide to the delivery carrier 300 a single use access code or digital key to unlock the storage receptacle, as described above. However, it is common that multiple parcels may be scheduled for delivery during the same delivery window, such as during holiday shopping periods, creating problems for securing delivery. Advantageously, the present invention allows for the ability to obtain delivery prioritization to avoid this issue.

At step S201, when contacted by one or more merchants or delivery carriers, the remote service manager 100 determines whether multiple deliveries are scheduled for the same delivery window. At step S202, the remote service manager 100 will confirm that the dimensions of the storage receptacle 10 are sufficient to accept multiple deliveries, when compared with the parcel identifying data received from the merchants or delivery carriers. At step S204, if the receptacle's capacity is insufficient, the remote service manager or TSM 100 may instruct one or more of the carriers 300 to delay or postpone delivery. In one or more embodiments, prior to instructing one or more carriers to postpone delivery, at step S203 the TSM may first contact the customer or intended recipient 400 of the parcels to obtain delivery prioritization, and then notify the delivery carrier(s) to delay/postpone delivery at step S204. At step S205, after obtaining delivery prioritization, the remote service manager 100 generates time-bound digital keys for each delivery to open the storage receptacle lock 20, corresponding to the intended recipient's desired priority.

In another aspect, as shown in FIG. 4, the present invention is directed to a method to confirm that the proper parcel is delivered. In one or more embodiments, the storage receptacle 10 may include one or more sensors 16 to ascertain parcel parameters that are typically captured by the delivery carrier 300, e.g., a scale or balancing means to measure the weight of the parcel, an infra-red, optical or ultrasonic sensor to measure approximate parcel dimensions, or a barcode or QR scanner to read a tracking label. The customer or intended recipient 400 purchases a parcel and specifies the storage receptacle 10 as the delivery address, as described above. When the delivery carrier 300 contacts the remote service manager or TSM 100 to provide order confirmation information, the carrier also provides the parcel identifying data or parameters, such as weight and/or dimensions of the parcel, to the remote service manager. At steps S301-S303, the access code or digital key generated by the remote service manager or TSM 100 is encoded with the parcel identifying data and, optionally, the identifying data for the storage receptacle (e.g., Serial Number, GPS coordinates), which is then decoded by the storage receptacle's processor 26 when received from the carrier's hand-held device 310 (step S304). At step S306, after transmitting the digital key to the storage receptacle's access code input interface 14, the processor 26 sends a signal to the actuator 23 to unlock the receptacle. At step S307, when the carrier 300 places the parcel into the storage receptacle, audio and/or video feedback is provided to confirm that the parcel placed into the storage receptacle has the parameters measured by the carrier and encoded within the digital key. If the parcel does not have the parameter(s) measured, the delivery carrier 300 may be immediately notified by one or both of an indicator, e.g., a flashing red strobe in the secure receptacle, or a message sent from the wireless communication radio 28 within the lock 20 to the carrier's hand-held device 310. Other methods of notification are not precluded. The feedback may then be forwarded via the carrier's hand held data connection back to the delivery carrier's servers, and then forwarded to the remote service manager or TSM 100, and optionally, to the customer or intended recipient of the parcel 400. If the delivered parcel has the identifying data encoded within the digital key, then at step S308 the storage receptacle relocks after detection of the parcel within the storage receptacle.

In another embodiment, the present invention is directed to a method to confirm that a parcel is delivered to the proper location. After proceeding through steps S101 to S108, as shown in FIG. 2, upon delivery of the parcel, the carrier 300 may take a photo of the parcel within the unlocked storage receptacle. An identifier (such as the serial number on the packaging or a bar code) may be placed within the storage receptacle and captured in the image. The image may then be transmitted by the carrier's handheld device 310 to the remote service manager 100 of the lock as confirmation of delivery, and optionally, provided to the intended recipient 400 by the remote service manager 100. Alternatively, the GPS metadata captured by the photo taken by the driver's hand-held device 310, in comparison with the storage receptacle's GPS metadata provided to the remote service manager or TSM 100 during initial registration of the storage receptacle, may serve as confirmation that the parcel was delivered to the proper storage receptacle.

FIG. 5 depicts a method of confirm that the parcel is delivered, wherein the intended recipient is unavailable to accept delivery and the delivery carrier demands signature confirmation. After the delivery carrier 300 has been contacted by the merchant or vendor 200 to pick up the parcel, during step S103 (as shown in FIG. 2) the delivery carrier provides the customer or recipient 400 with an estimated delivery time. The customer 400 then confirms that they will be available to receive a communication from the delivery carrier's handheld or mobile device 310 at the estimated time, and if not, a mutually convenient time for delivery and customer availability is determined and scheduled. The carrier 300 then contacts the remote service manager 100 to provide delivery information and receives a single use access code or digital key from the remote service manager, as shown in steps S104 and S105 of FIG. 2. As the carrier nears the location of the storage receptacle (based on carrier's GPS data), the carrier's server contacts the customer via a software application running on a computing device 410 operated by the customer (step S401). At steps S405 to S406, the carrier's handheld device 310 captures and transmits a photo or video to the customer's computing device 410 of the carrier opening the receptacle and placing parcel therein, after transmitting a valid access code to the lock interface (steps S402 to S404). At step S407, the customer 400 then digitally signs, via the software application, to confirm acceptance of delivery. In one or more embodiments, the carrier 300 may further transmit video of the closing and locking of the storage receptacle to the recipient (step S408).

Referring now to FIG. 6, the method of the present invention is also applicable to storage receptacles utilizing WiFi or Z-wave enabled locking mechanisms. At step S501, the customer 400 purchases a parcel and specifies the storage receptacle 10 as the delivery address. At step S504, when the delivery carrier 300 contacts the remote service manager or TSM 100 to provide order confirmation information, rather than providing the carrier's mobile device 310 with a single use digital key, the remote service manager or TSM 10 provides to the carrier an identifying time-bound hyperlink (step S505). When the carrier 300 arrives at the storage receptacle (within specified delivery time window), the carrier accesses the hyperlink, and the remote service manager 100 transmits to both the storage receptacle 10 and the carrier 300 a single-use, carrier specific personal identification number (PIN) which is forwarded to the carrier's handheld device 310 and which may be time-bound and valid only for a certain date/time period (step S506). In an embodiment, a geo-fence may also identify the carrier's approach to the storage receptacle based on comparing the delivery carrier mobile device's 310 and storage receptacle's 10 GPS metadata. At steps S507 to S509, the carrier 300 manually enters a valid PIN on the lock interface 14 to open the storage receptacle and delivers the parcel. At step S510, the lock 20 may record the opening-event, and via its data feed 28 provide this information back to the remote service manager or TSM 100 of the lock, which records the event and forwards the information to the carrier 300 and, optionally, notifies the customer 400 of the storage receptacle entry by the specific carrier for the specific order/tracking number.

The home storage receptacle is also useful for vacationers at VRBO-type locations. At the outset of the transaction, i.e. when establishing a rental contract, the homeowner may notify the vacationer of the opportunity to utilize the storage receptacle 10 located at or outside the home to receive any deliveries the vacationer may order, and provides to the vacationer the serial number of the storage receptacle. If vacationer desires to utilize the storage receptacle, they must register with the remote service manager or TSM 100 of the lock, and provide the duration of their stay. The registration request is forwarded by the TSM 100 to the homeowner for approval, who confirms that the time-bound is correct. The vacationer may then place an order with a merchant or vendor 200 for delivery to the storage receptacle, and as described above with respect to FIG. 6, after delivery, the remote service manager or TSM 100 forwards a second identifying hyperlink (similar to that provided to the delivery carrier) including a single-use PIN to the vacationer so that they may manually enter the PIN on the lock interface 14 of the storage receptacle to retrieve the parcel.

In still yet another aspect, the present invention is directed to a method to assure a delivery carrier that the storage receptacle is operative (e.g. if there's a dead battery). When the delivery carrier contacts customer, as described above, the carrier 300 requests the customer to poll the lock with the customer's handheld device 410 to obtain battery diagnostics. Each carrier, upon delivery, provides the digital key to the lock, and obtains battery diagnostics. This battery diagnostic information is provided to the remote service manager or TSM server 100, and is shared with the delivery carrier when the carrier initially contacts the remote service manager. If the freshness of the diagnostic information fails to meet a threshold, then either the remote service manager, the merchant or vendor, or delivery carrier, requests that customer connect to their lock with customer's hand-held device to refresh diagnostic information and/or change the battery. In a Z-wave or WiFi implementation, the lock 20 may periodically refresh battery diagnostic information to the remote service manager server. The storage receptacle 10 can also be hardwired to mains power and/or data (POE or data-enhanced power). In one or more embodiments, the delivery carrier 300 may be instructed to have a 9V battery available to jump start the lock, if necessary.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A system for securing delivery of parcels to a storage receptacle for a residential home, the system comprising:

the storage receptacle having an electronically-controlled locking mechanism, the storage receptacle comprising a wireless interface and one or more first processors, and at least one first storage medium comprising instructions which, when executed by the one or more first processors, cause the one or more first processors to carry out a first method comprising:

receiving an access code for facilitating unlocking of the electronically-controlled locking mechanism of the storage receptacle, in response to confirming validity of the received access code, unlocking the electronically-controlled locking mechanism, detecting whether one or more expected parcels is within the storage receptacle, wherein detecting whether the one or more expected parcels are within the storage receptacle comprises:

detecting one or more identifying parameters of contents of the storage receptacle, and in response to determining that the one or more identifying parameters of the contents of the storage receptacle match expected identifying parameters for the one or more expected parcels, determining that the one or more expected parcels are within the storage receptacle; and in response to detecting that the one or more expected parcels are within the storage receptacle, locking the electronically-controlled locking mechanism;

at least one computing device configured to generate one or more access codes and to transmit the one or more access codes to one or more mobile computing devices associated with one or more delivery carriers via at least one network, the at least one computing device comprising one or more second processors and at least one second storage medium comprising instructions which, when executed by the one or more second processors, cause the one or more second processors to carry out a second method comprising:

determining whether multiple parcels are scheduled for delivery to the storage receptacle during a same first estimated delivery window by the one or more delivery carriers;

in response to determining that multiple parcels are scheduled for delivery to the storage receptacle during the same first estimated delivery window by the one or more delivery carriers and that storage receptacle dimensions of the storage receptacle are insufficient to accept the multiple parcels:

obtaining, from an intended recipient of the multiple parcels, a delivery prioritization of the multiple parcels;

instructing, based at least in part on the delivery prioritization, at least one of the one or more delivery carriers to postpone delivery of a first parcel of the multiple parcels to the storage receptacle such that the first parcel is delivered to the storage receptacle during a second estimated delivery window different than the same first estimated delivery window;

instructing based at least in part on the delivery prioritization, at least one of the one or more delivery carriers to deliver a second parcel of the multiple parcels to the storage receptacle during the same first estimated delivery window; and generating a first time-bound access code that is bound to the same first estimated delivery window for delivery of the second parcel to the storage receptacle and a second time-bound access code that is bound to the second estimated delivery window for delivery of the first parcel to the storage receptacle; and a mobile computing device comprising at least one wireless communication radio, one or more third processors, and at least one third storage medium comprising instructions which, when executed by the one or more third processors, cause the one or more third processors to carry out a third method comprising:

receiving, via the at least one wireless communication radio and from the at least one computing device, the first generated time-bound access code for facilitating unlocking of the electronically-controlled locking mechanism of the storage receptacle during the same first estimated delivery window or the second generated time-bound access code for facilitating unlocking of the electronically-controlled locking mechanism of the storage receptacle during the second estimated delivery window; and transmitting, via the at least one wireless communication radio, the first generated time-bound access code to the wireless interface of the storage receptacle during the same first estimated delivery window so that the storage receptacle can be unlocked for delivery of the second parcel during the same first estimated delivery window or the second generated time-bound access code to the wireless interface of the storage receptacle during the second estimated delivery window so that the storage receptacle can be unlocked for delivery of the first parcel during the second estimated delivery window.

2. The system of claim 1, wherein
the system further comprises at least one camera at the storage receptacle in a location positioned to record activity of a delivery carrier.

3. The system of claim 1, wherein detecting whether one or more expected parcels are within the storage receptacle comprises detecting the one or more identifying parameters of the contents of the storage receptacle with at least one sensor of the storage receptacle.

4. The system of claim 3, wherein the at least one sensor comprises an infrared scanner or ultrasonic scanner to measure parcel dimensions, a barcode scanner or a QR code scanner to read a tracking label on the one or more expected parcels, and/or a scale to measure a weight of the one or more expected parcels.

5. A method for securing delivery of parcels to a storage receptacle for a residential home, the storage receptacle comprising an electronically-controlled locking mechanism, a wireless interface, and at least one processor, the method comprising:

wirelessly receiving, by the wireless interface of the storage receptacle and from a remote computing device, at least one time-bound access code that is bound to at least one estimated delivery window for unlocking of the storage receptacle, wherein wirelessly receiving the at least one time-bound access code comprises:

when multiple parcels are scheduled for delivery to the storage receptacle during a same first estimated delivery window and storage receptacle dimensions of the storage receptacle are insufficient to accept the multiple parcels:

wirelessly receiving a first time-bound access code during the same first estimated delivery window for unlocking of the storage receptacle for delivery of a first parcel of the multiple parcels based on the remote computing device determining, based on a delivery prioritization of the multiple parcels, to deliver the first parcel during the same first estimated delivery window, and wirelessly receiving a second time-bound access code during a second estimated delivery window for unlocking the storage receptacle for delivery of a second parcel of the multiple parcels based on the remote computing device determining, based on the delivery prioritization of the multiple parcels, to change a delivery time of the second parcel to the second estimated delivery window, the second estimated delivery window being different than the same first estimated delivery window;

in response to confirming, by the at least one processor, validity of the at least one time-bound access code, unlocking, by the at least one processor, the electronically-controlled locking mechanism to permit access to an interior of the storage receptacle;

detecting whether one or more expected parcels is within the storage receptacle, wherein detecting whether the one or more expected parcels is within the storage receptacle comprises detecting one or more identifying parameters of contents of the storage receptacle; and in response to detecting that the one or more expected parcels is within the storage receptacle, re-locking, by the at least one processor, the electronically-controlled locking mechanism.

6. The method of claim 5, further comprising:
with at least one computing device:
contacting, by a delivery carrier, an intended recipient of the multiple parcels to obtain authorization for delivery of the multiple parcels to the storage receptacle based on parcel and storage receptacle identifying data received from a vendor, wherein the storage receptacle identifying data comprises at least one of a serial number or global positioning system metadata.

7. The method of claim 5, further comprising:
with the remote computing device:
instructing, based on the delivery prioritization, at least one of one or more delivery carriers to deliver the first parcel of the multiple parcels during the same first estimated delivery window;

instructing, based on the delivery prioritization, at least one of the one or more delivery carriers to change the delivery time of the second parcel of the multiple parcels; and prior to instructing the one or more delivery carriers to change the delivery time of the second parcel of the multiple parcels:

contacting an intended recipient of the multiple parcels to obtain the delivery prioritization; and
generating the second time-bound access code for the delivery of the second parcel of the multiple parcels.

8. The method of claim 5, wherein detecting one or more identifying parameters of contents of the storage receptacle comprises:
measuring, by at least one sensor of the storage receptacle, dimensions and/or weight of an object in the storage receptacle; and
validating that the object is a parcel of the one or more expected parcels, wherein the validating comprises determining, by the at least one processor, whether the dimensions and/or weight of the object match expected dimensions and/or weight of the parcel;
wherein the storage receptacle comprises the at least one sensor for measuring the dimensions and/or weight of the object.

9. The method of claim 8, wherein the at least one sensor comprises an infrared scanner, an ultrasonic scanner, a barcode scanner, a QR code scanner, and/or a scale.

10. The method of claim 8, wherein the storage receptacle includes one or more audible and/or visible feedback mechanisms, and the method further comprises, in response to confirming, by the at least one processor, that the dimensions and/or weight of the object match the expected dimensions and/or weight of the parcel, presenting audible and/or visible feedback from the storage receptacle via the one or more audible and/or visible feedback mechanisms.

11. The method of claim 10, further comprising:
transmitting, from a delivery carrier mobile computing device, the audible and/or visible feedback to a remote service manager and/or an intended recipient of the parcel.

12. The method of claim 8, further comprising, in response to determining in the validating that the dimensions and/or weight of the object do not match the expected dimensions and/or weight of the parcel, outputting an error notification.

13. The method of claim 5, further comprising:
photographing, by a delivery carrier mobile computing device, at least one parcel of the multiple parcels being placed in the storage receptacle;
comparing, with at least one computing device remote from the storage receptacle, photograph global positioning system metadata to storage receptacle global positioning system metadata to detect a match; and
responsive to detecting a match, confirming that the at least one parcel was delivered to a correct storage receptacle.

14. The method of claim 5, further comprising:
reporting an event to at least one computing device remote from the storage receptacle via the wireless interface of the storage receptacle.

15. The method of claim 14, wherein the event is selected from a group comprising: presence of a delivered parcel in the storage receptacle; opening or closing of the storage receptacle; entry of a valid access code; and entry of an invalid access code.

16. The method of claim 5, wherein the storage receptacle further comprises at least one camera, and
wherein the method further comprises triggering, with the at least one processor, recording by the at least one camera in response to receipt of the at least one time-bound access code,
recording an entry event at the storage receptacle; and
reporting the entry event via the wireless interface.

17. The method of claim 5, wherein:
detecting whether the one or more expected parcels is within the storage receptacle further comprises:
determining whether the one or more identifying parameters of the contents of the storage receptacle match one or more expected parameters for the one or more expected parcels; and
in response to determining that the one or more identifying parameters match the one or more expected parameters, validating that the one or more expected parcels are in the storage receptacle; and
re-locking the electronically-controlled locking mechanism in response to detecting that the one or more expected parcels is within the storage receptacle comprises locking the electronically-controlled locking mechanism in response to validating that the one or more expected parcels is in the storage receptacle.

18. A system for securing delivery of parcels to a storage receptacle for a residential home, the system comprising:
the storage receptacle having an electronically-controlled locking mechanism, the storage receptacle comprising a wireless interface and one or more first processors, and at least one first storage medium comprising instructions which, when executed by the one or more first processors, cause the one or more first processors to carry out a first method comprising:
receiving an access code for facilitating unlocking of the electronically-controlled locking mechanism of the storage receptacle,
in response to confirming validity of the received access code, unlocking the electronically-controlled locking mechanism,
detecting whether one or more expected parcels is within the storage receptacle,
wherein detecting whether the one or more expected parcels are within the storage receptacle comprises:
detecting one or more identifying parameters of contents of the storage receptacle, and
in response to determining that the one or more identifying parameters of the contents of the storage receptacle match expected identifying parameters for the one or more expected parcels, determining that the one or more expected parcels are within the storage receptacle; and
in response to detecting that the one or more expected parcels are within the storage receptacle, locking the electronically-controlled locking mechanism;
at least one computing device configured to generate one or more access codes and to transmit the one or more access codes to one or more mobile computing devices associated with one or more delivery carriers via at least one network, the at least one computing device comprising one or more second processors and at least one second storage medium comprising instructions which, when executed by the one or more second processors, cause the one or more second processors to carry out a second method comprising:
determining whether multiple parcels are scheduled for delivery to the storage receptacle during a same first estimated delivery window by the one or more delivery carriers;
in response to determining that multiple parcels are scheduled for delivery to the storage receptacle during the same estimated delivery window by the one or more delivery carriers and that storage receptacle dimensions of the storage receptacle are insufficient to accept the multiple parcels:
obtaining, from an intended recipient of the multiple parcels, a delivery prioritization of the multiple parcels;
instructing, based at least in part on the delivery prioritization, at least one of the one or more delivery carriers to deliver a first parcel of the multiple parcels to the storage receptacle during the same first estimated delivery window and generating a first time-bound access code that is bound to the same first estimated delivery window for delivery of the first parcel to the storage receptacle; and
instructing, based at least in part on the delivery prioritization, at least one of the one or more delivery carriers to deliver a second parcel of the multiple parcels to the storage receptacle during a second estimated delivery window different than the same first estimated delivery window and generating a second time-bound access code that is bound to the second estimated delivery window for delivery of the second parcel to the storage receptacle; and
each of the one or more mobile computing devices comprising at least one wireless communication radio, one or more third processors, and at least one third storage medium comprising instructions which, when executed by the one or more third processors, cause the one or more third processors to carry out a third method comprising:
receiving, via the at least one wireless communication radio and from the at least one computing device, the first generated time-bound access code that is bound to the same first estimated delivery window, wherein the first generated time-bound access code facilitates unlocking of the electronically-controlled locking mechanism of the storage receptacle during the same first estimated delivery window for delivery of the first parcel of the multiple parcels to the storage receptacle;
transmitting, via the at least one wireless communication radio, the first generated time-bound access code to the wireless interface of the storage receptacle during the same first estimated delivery window;
receiving, via the at least one wireless communication radio and from the at least one computing device, the second generated time-bound access code that is bound to the second estimated delivery window, wherein the second generated time-bound access code facilitates unlocking of the electronically-controlled locking mechanism of the storage receptacle during the second estimated delivery window for delivery of the second parcel of the multiple parcels to the storage receptacle; and
transmitting, via the at least one wireless communication radio, the second generated time-bound access code to the wireless interface of the storage receptacle during the second estimated delivery window.

19. The system of claim 18, wherein the first generated time-bound access code is operative during the same first estimated delivery window and is deactivated after detection of the first parcel of the multiple parcels within the storage receptacle.

20. The system of claim 18, wherein the second generated time-bound access code is operative during the second estimated delivery window and is deactivated after detection of the second parcel of the multiple parcels within the storage receptacle.

21. The system of claim 18, wherein the second method further comprises determining whether the storage receptacle is in an operative state, wherein determining whether the storage receptacle is in an operative state comprises:
determining, based on battery diagnostic information associated with the storage receptacle, whether the storage receptacle is in the operative state, wherein the determination of whether the storage receptacle is in the operative state is performed prior to instructing the at least one of the one or more delivery carriers to deliver the first parcel of the multiple parcels during the same first estimated delivery window and/or prior to instructing the at least one of the one or more delivery carriers to deliver the second parcel of the multiple parcels during the second estimated delivery window.

* * * * *